United States Patent
Fomitchov

(10) Patent No.: US 7,953,308 B2
(45) Date of Patent: May 31, 2011

(54) SYSTEM AND METHOD FOR FIBER OPTIC BUNDLE-BASED ILLUMINATION FOR IMAGING SYSTEM

(75) Inventor: Pavel A. Fomitchov, New York, NY (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 11/320,675

(22) Filed: Dec. 30, 2005

(65) Prior Publication Data

US 2007/0154153 A1 Jul. 5, 2007

(51) Int. Cl.
*G02B 6/06* (2006.01)
(52) U.S. Cl. .......................... 385/116; 385/118
(58) Field of Classification Search ........... 385/115–121
See application file for complete search history.

(56) References Cited

U.S. PATENT DOCUMENTS

| | | | |
|---|---|---|---|
| 4,826,299 A | 5/1989 | Powell | |
| 6,388,788 B1 | 5/2002 | Harris et al. | |
| 6,677,565 B1 | 1/2004 | Wahl et al. | |
| 7,292,390 B2 * | 11/2007 | Lin et al. | 359/385 |
| 2004/0264897 A1 | 12/2004 | Lin et al. | |

FOREIGN PATENT DOCUMENTS

WO  WO 95/11461  4/1995

OTHER PUBLICATIONS

Hooper et al., "Developments and Applications of Photon Imaging for Biomolecular Screening," The Society for Biomolecular Screening (1995).
Flushberg et al., "Fiber-optic fluorescence imaging," Nature Methods 2:12, 941-50 (Dec. 2005).
Helmchen, "Miniaturization of fluorescence microscopes using fibre optics," Exp. Physiol 87:6, 737-45 (2002).
Product Specification (No. DTS0105) by OZ Optics Limited, "RGB (Red/Green/Blue) Combiner and Delivery Systems," pp. 1-7 (Jun. 10, 2005).

* cited by examiner

*Primary Examiner* — Kevin S Wood
(74) *Attorney, Agent, or Firm* — Yonggang Ji

(57) ABSTRACT

A system and method for fiber optic bundle-based illumination for an imaging system is disclosed. According to one embodiment of the present invention, the system includes a fiber optic bundle that comprising a plurality of optical fibers. Each optical fiber receives light from a light source. The system also includes a beam forming element that selects a mode of operation for the imaging system. The system further includes a beam deflecting device that deflects the light on a sample. According to one embodiment of the present invention, the method includes the steps of (1) selecting a mode of operation for the imaging system; (2) transmitting light from at least one light source through a fiber optic bundle, the fiber optic bundle comprising a plurality of optical fibers; (3) providing a beam forming element based on the selected mode of operation; and (4) deflecting the focused light on a sample.

22 Claims, 3 Drawing Sheets

SYSTEM AND METHOD FOR FIBER OPTIC BUNDLE-BASED ILLUMINATION FOR IMAGING SYSTEM

BACKGROUND OF THE INVENTION

1. Field of the Invention

The present invention generally relates to fiber optic bundle-based illumination, and, more particularly, to a system and method for fiber optic bundle-based illumination for an imaging system.

2. Description of the Related Art

Light can be delivered from a remote source to a destination in several ways. One way in which this may be achieved is by transmitting the light in free space. Another way is to transmit the light through optical fibers.

When used in microscopy, optical fibers allow an illumination light source, photodetectors, or both, to be located remotely from the microscope. For example, Publication WO95/11461 and Hooper et al., "Developments and Applications of Photon Imaging for Biomolecular Screening," The Society For Biomolecular Screening (1995), the disclosures of which are incorporated by reference in their entireties, disclose the use of a fiber optic taper to transmit from a sample to a CCD detector.

There are two basic categories of optical fibers: single mode optical fibers that are specific to a wavelength and can guide only a single spatial mode, and multimode optical fibers that can guide more than one wavelength and multiple spatial modes.

Single mode optical fibers are well-suited for confocal illumination delivery because the single spatial mode can be focused to a near diffraction-limited spot in the specimen plane of the microscope. This allows high resolution imaging. Multimode optical fibers, however, are commonly used for both delivery of light and fluorescence collection because they possess larger core diameters and usually have greater numerical aperture values. Optical fibers and their uses in microscopy are discussed in detail in Flushberg et al., "Fiber-optic fluorescence imaging," Nature Methods 2:12 941-50 (December 2005) ("Flushberg"), and Helmchen, "Miniaturization of fluorescence microscopes using fibre optics," Exp. Physiol 87.6 737-45 (2002), the disclosures of which are incorporated by reference in their entireties.

Optical fibers may also be grouped together in what are often referred to as fiber optic bundles. Fiber optic bundles may consist of a plurality of individual single mode or multimode optical fibers and are commonly used for fluorescent illumination and scanning confocal imaging. See Flushberg at 944. For example, when used in a line confocal system, fiber optic bundles may be used to transmit light from the light source to the sample. As illustrated in FIG. 2b of Flushberg, light from a light source is reflected by an one-dimensional scanner and then passed through a cylindrical lens. The cylindrical lens focuses the light into one axis, such as the horizontal or vertical axis. The focused light then enters a fiber bundle long the selected axis and is delivered to the sample.

Although effective, the approach illustrated in Flushberg has several drawbacks. For example, because cladding around each optical fiber creates a spacing between the light-carrying portions of the optical fibers, the light output from the bundle will not be uniform. This reduces spatial resolution of both the illumination and collection light. This pixilation can reduce the lateral optical resolution in the specimen plane by about twice the average core-to-core distance between fibers divided by the optical magnification of the imaging lens. See Flushberg at 944.

In fluorescence microscopy it is common to use more than one fluorescent dye in a sample. Accordingly, it is often necessary to use multiple sources of excitation light for each fluorescent dye. To accomplish this, optical fibers are commonly used to deliver the different light from each light source to the sample. In practice, when conventional fiber optic beam combiners are used, multiple single mode optical fibers may be used to deliver the light from the light source to a single output optical fiber. However, this approach is inefficient because of losses associated with the optical coupling of the input optical fibers to the single output optical fiber. In addition, the single output optical fiber is not optimized for transmission of the typical wavelengths required for fluorescent illumination, i.e., from the near IR to the near UV.

SUMMARY OF THE INVENTION

A system for fiber optic bundle-based illumination for an imaging system is disclosed. According to one embodiment of the present invention, the system includes a fiber optic bundle that comprising a plurality of optical fibers. Each optical fiber receives light from a light source. The system also includes a beam forming element that selects a mode of operation for the imaging system. The system further includes a beam deflecting device that deflects the light on a sample.

A method for fiber optic bundle-based illumination for an imaging system is also disclosed. According to one embodiment of the present invention, the method includes the steps of (1) selecting a mode of operation for the imaging system; (2) transmitting light from at least one light source through a fiber optic bundle, the fiber optic bundle comprising a plurality of optical fibers; (3) providing a beam forming element based on the selected mode of operation; and (4) deflecting the focused light on a sample.

The imaging system of the present invention may operate in line confocal mode and wide field mode. The system and method may further include a beam collimator. The beam collimator may be a lens-based collimator or a mirror-based collimator.

The optical fibers in the fiber optic bundle may be multimode optical fibers and/or single mode optical fibers. The optical fibers in the fiber optic bundle may also be polarization maintaining optical fibers, photonic crystal optical fibers, and combinations thereof.

The optical fibers at an output end of the fiber optic bundle may be are axially offset with respect to an axis of the fiber optic bundle. The optical fibers at an output end of the fiber optic bundle may be are arranged in a single line pattern, a multiple line pattern, a cross pattern, a circular pattern, and a rectangular pattern. The optical fibers at an output end of the fiber optic bundle are uniformly spaced.

The spacing between cores of the optical fibers at an output end of the fiber optic bundle may be reduced by chemical etching, partial cladding removal, tapering, and/or fusing.

The ends of the optical fibers may be have a geometry that is normal to an optical axis of the optical fibers, at an angle to the optical axis of the optical fibers at an output end of the fiber optic bundle, or spherical.

The optical fibers in the fiber optic bundle may be combined into an optical connector at an output end of the fiber optic bundle.

The system may also include a device that modifies optical parameters of the transmitted light. Such a device may include an attenuator, a polarization controller, a shutter, an acousto-optic modulator, an electro-optic modulator. In another embodiment, a device that monitors the parameters of the light, such as a power meter, may be used.

In one embodiment, light may be transmitted through the fiber optic bundle sequentially one optical fiber at a time. In another embodiment, light may be transmitted through two or more optical fibers simultaneously. In still another embodiment, light may be transmitted through the fiber optic bundle sequentially one wavelength at a time. In yet another embodiment, two or more wavelengths may be simultaneously transmitted through the fiber optic bundle.

The light source may be selected form the group consisting of lasers, laser diodes, light emitting diodes, lamps, and combinations thereof.

The beam forming element may be include Powell lenses, cylindrical lenses, diffraction gratings, holographic elements, and conventional lens having spherical or aspherical surfaces.

The beam deflecting device may include a scanning mirror and at least one actuator such as a galvanometer.

It is a technical advantage of the present invention that a system and method for fiber optic bundle-based illumination for imaging is disclosed. It is another technical advantage of the present invention that a fiber optic bundle is used to transmit light from light sources to an optical system. It is a further technical advantage of the present invention that the imaging system may operate in line confocal mode and wide field mode.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
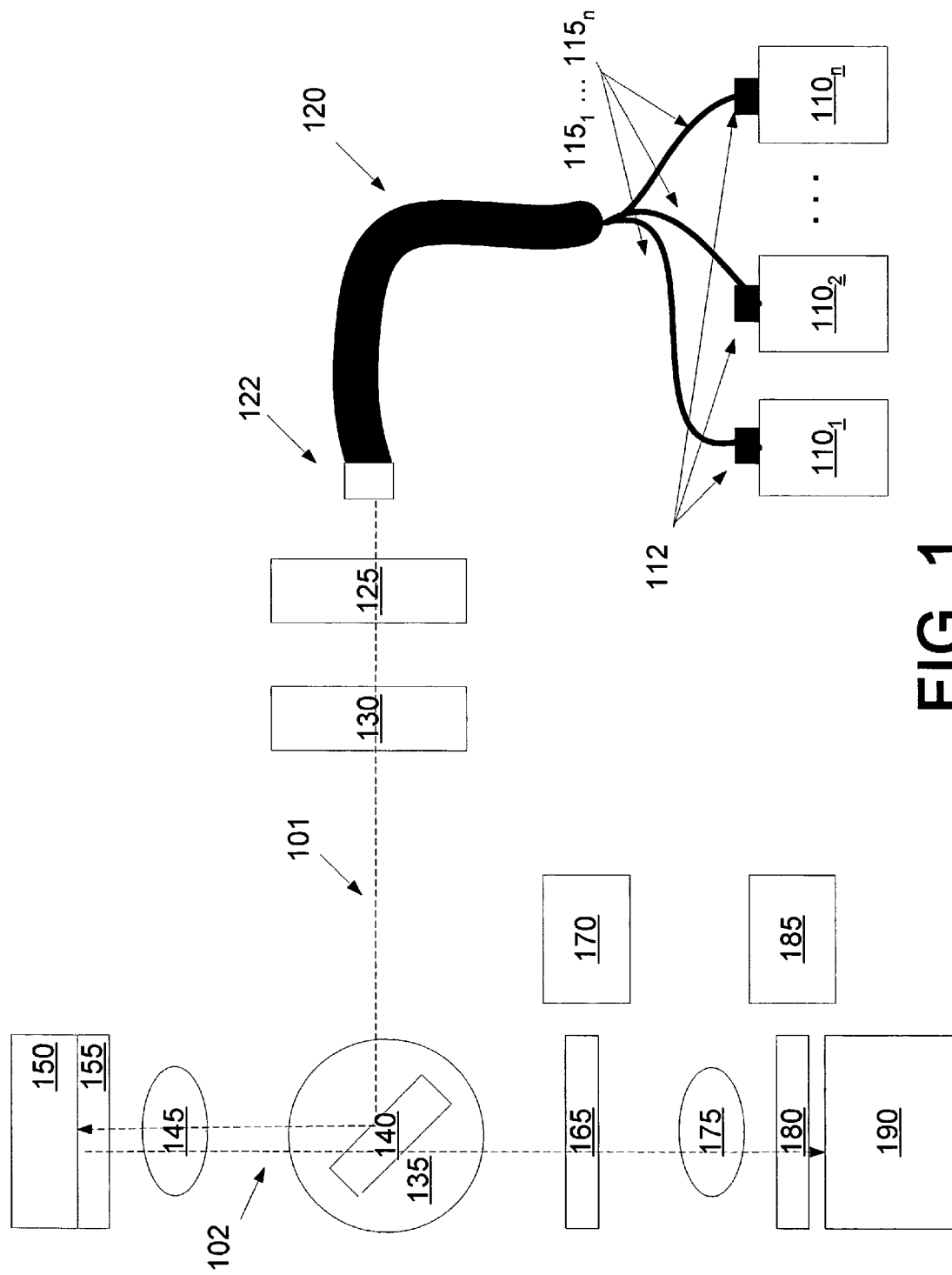
FIG. 1 is a block diagram of a system for fiber optic bundle-based illumination for fluorescent imaging according to one embodiment of the present invention.
Figure 2A:
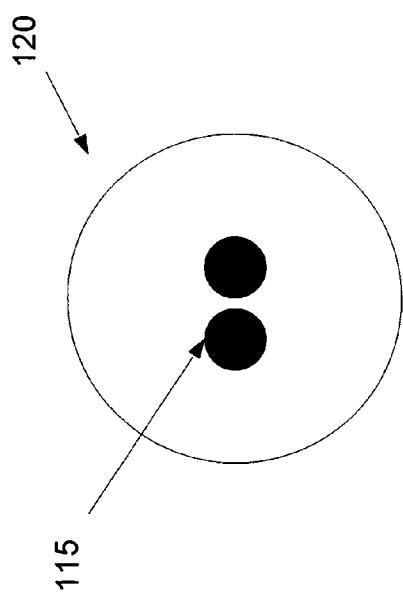
FIGS. 2a-2d are examples of arrangements of optical fibers within a fiber optic bundle according to embodiments of the present invention.
Figure 2B:
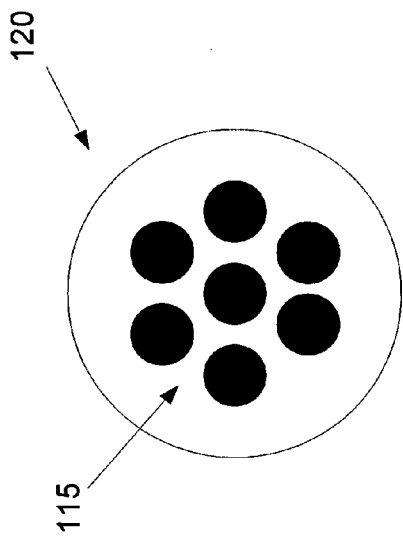
Figure 2C:
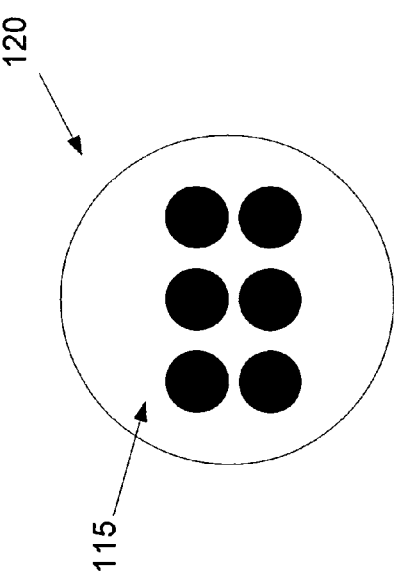
Figure 2D:
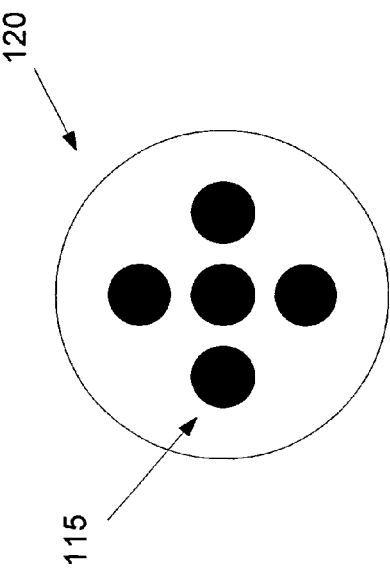
Figure 3:
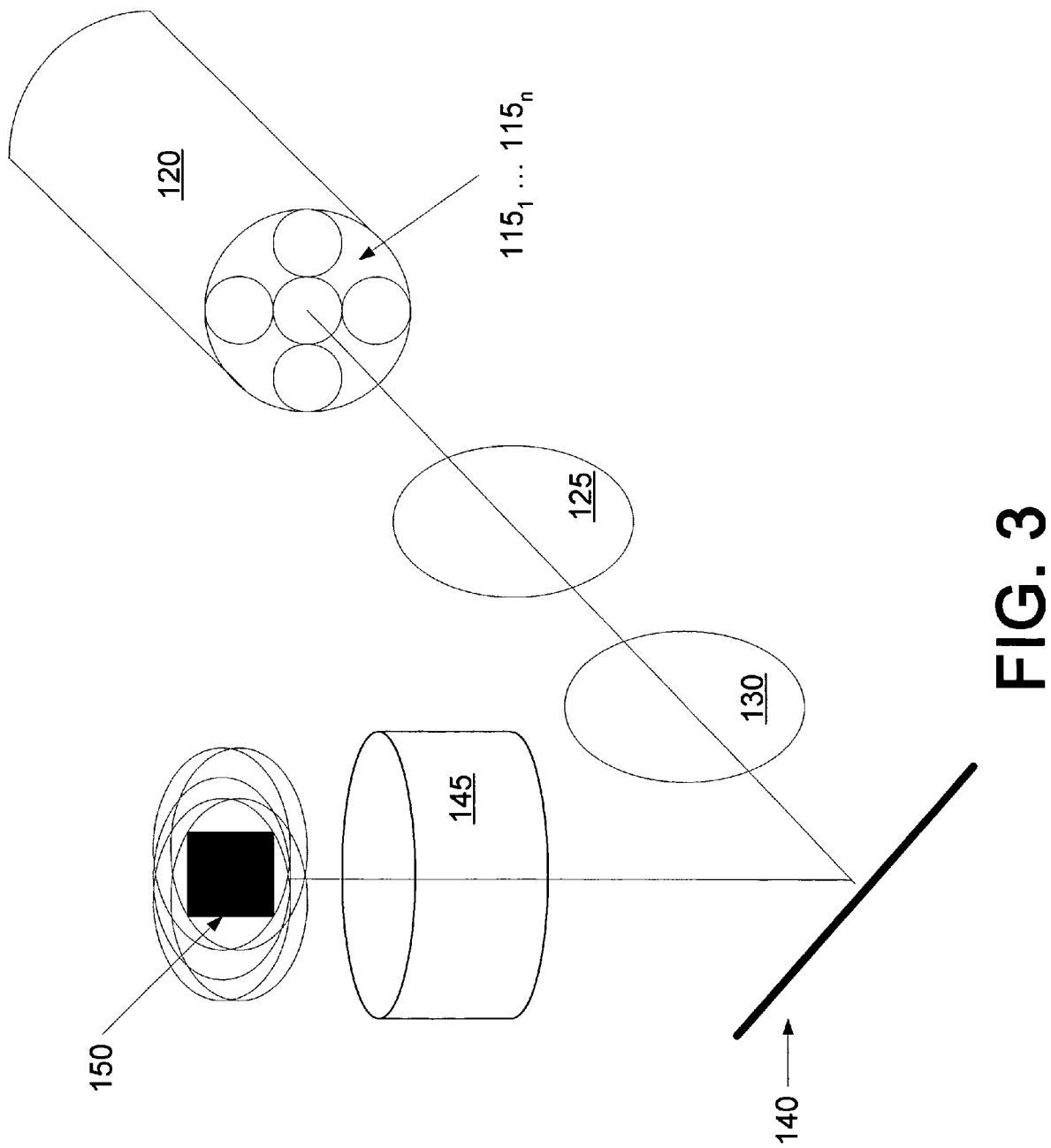
FIG. 3 is a schematic a system operating in wide field mode according to one embodiment of the present invention.

Preferred embodiments of the present invention and their advantages may be understood by referring to FIGS. 1-3, wherein like reference numerals refer to like elements.

The system and method of the present invention are suitable for use with a line confocal microscope that does not use optical fibers for fluorescent collection. Examples of such devices are disclosed in U.S. patent application Ser. No. 11/184,444 entitled "Method and Apparatus for Fluorescent Confocal Microscopy," and U.S. patent App. entitled "Autofocus Method And System For An Automated Microscope" filed Dec. 30, 2005, the disclosures of which are hereby incorporated by reference in their entireties.

In one embodiment, the system of the present invention may be used with microscopes that operate in wide field mode, point scanning mode or line confocal mode. In one embodiment, the system may be used with a fluorescent confocal microscope.

Referring to FIG. 1, a block diagram of a system for fiber optic bundle-based illumination for fluorescent imaging is schematically presented and includes one or more light sources $110_1$-$110_n$ to excite fluorescent (or fluorescently stained or labeled) target 150 and one or more detectors 190 to detect fluorescent emissions. System 100 may contain other components as would ordinarily be found in confocal and wide field fluorescent microscopes. The following sections describe these and other components in more detail. For a number of the components there are multiple potential embodiments.

For illustration only, excitation light is illustrated as dashed line 101, while reflected light is illustrated as dashed line 102.

Light sources $110_1$-$110_n$ may include any source capable of delivering light of the excitation wavelength to the target. Examples of suitable light sources include lasers, laser diodes, light emitting diodes, and lamps. Other light sources may be used as appropriate.

In one embodiment, two or more lasers covering the optical spectrum from the near IR to the near UV are provided as light sources $110_1$-$110_4$. Any practical number of lasers can be used, and the number of light sources provided may depend on the number of fluorescent dyes present in the sample that require different excitation light wavelengths.

As disclosed in U.S. patent application Ser. No. 11/184,444, light from the light sources is coupled to the rest of the system by either delivering the light as a free space beam of the appropriate diameter, direction and degree of collimation or via fiber optic light delivery system. In the free space embodiment, a laser selection module is used to select the laser to be transmitted through free space. In the present invention, the light from each of these lasers is coupled to the rest of system via individual optical fibers in an optical fiber bundle.

Fiber optic bundle 120 comprises a plurality of optical fibers $115_1$-$115_n$. The number of optical fibers 115 included may vary as necessary. In one embodiment, the number of optical fibers 115 included in fiber optic bundle 120 may be based on the number of potential light sources that are required to be delivered to sample 150. It is preferable that fiber optic bundle 120 includes optical fibers that have similar numerical apertures to provide similar divergence of all output beams because the output beams travel through the same optical system.

An example of a suitable fiber optic bundle includes seven single mode optical fibers. Each optical fiber may have a length that is suitable to couple light sources $110_1$-$110_n$ to the remainder of the optical system. Such a fiber bundle is generally available. Other types, sizes, and numbers of optical fibers may be used as necessary and desired.

Each light source $110_1$-$110_n$ may be provided with optical fiber $115_1$-$115_n$. In one embodiment, optical fiber $115_1$-$115_n$ is a single mode optical fiber that is preferably selected to match the wavelength of the light source. Optical fibers $115_1$-$115_n$ may be polarization maintaining fibers, or may be photonic crystal fibers Optical fibers $115_1$-$115_n$ at the output end of fiber optic bundle 120 may have a variety of arrangements. Referring to FIGS. 2a-2d, several examples of arrangements of optical fibers $115_1$-$115_n$ within fiber optic bundle 120 are provided. These arrangements include a line, shown in FIG. 2a, a circle, shown in FIG. 2b, multiple lines, shown in FIG. 2c, and a cross, shown in FIG. 2d. Other arrangements may be used as necessary or desired.

In one embodiment, optical fibers $115_1$-$115_n$ within fiber optic bundle 120 may be uniformly spaced. In another embodiment, optical fibers $115_1$-$115_n$ are not uniformly spaced.

As discussed above, the cladding that surrounds optical fibers $115_1$-$115_n$ causes the spatial separation between fiber cores, that in turn, can reduce spatial resolution. Accordingly, in one embodiment, the spacing between optical fibers $115_1$-

$115_n$ may be reduced by partially removing the cladding by chemical etching. This may be performed close to the output end of fiber optic bundle 120.

Other techniques for reducing the spacing between optical fibers $115_1$-$115_n$ include tapering optical fibers $115_1$-$115_n$ and fusing optical fibers $115_1$-$115_n$. Other techniques may be apparent to one of ordinary skill in the art.

Optical fibers $115_1$-$115_n$ may be axially offset relative to the axis of fiber optic bundle 120 at the output end of fiber optic bundle 120. This may be performed to in order to compensate for chromatic aberration of optical components (e.g., beam collimator 125, beam forming element 130, etc.) for a specific wavelength used for illumination. The amount by which the fiber tip extends beyond the end of fiber bundle 120 is such that the fiber tip ends at a point that compensates for the chromatic aberration. In one embodiment, this design eliminates a need for re-adjustment of the illumination optical system after switching to a source with another wavelength during sequential imaging procedure (one wavelength at the time), and allows for chromatic aberration-free imaging using two or more wavelengths at the time.

Optical fibers $115_1$-$115_n$ in fiber optic bundle 120 are spatially separated at the output end of fiber optic bundle 120. In one embodiment, this spatial separation may create two or more non-overlapping illumination areas on a specimen. This allows simultaneous fluorescence detection using multiple optical detectors or multiple sections of the same detector that are optically conjugated to the corresponding illumination areas.

Optical fibers $115_1$-$115_n$ may also be polished at their respective output ends to a particular geometry. In one embodiment, optical fibers $115_1$-$115_n$ may have a geometry that is normal to the optical axis of the fiber. With such a geometry, the output beams of optical fibers $115_1$-$115_n$ are parallel to the optical axis of fiber optic bundle 120.

In another embodiment, optical fibers $115_1$-$115_n$ may be polished to have a geometry that is at an angle to the optical axis of the fiber. With such a geometry, the output beams of optical fibers $115_1$-$115_n$ propagate at an angle to the optical axis of fiber optic bundle 120. Angle polishing provides an additional degree of control over the position of the illumination area in the field of view.

In still another embodiment, optical fibers $115_1$-$115_n$ may be polished (e.g., configured, formed, processed, etc.) to have a spherical geometry. Spherical polishing allows control the divergence of the output beam because it is equivalent to placing a miniature lens in front of the fiber. This approach can be used for optical compensation of difference in numerical apertures (NA) of optical fibers $115_1$-$115_n$. It is important because fibers with different NA produce a beams of different divergence at the output end.

Optical fibers $115_1$-$115_n$ may have tips with other geometries as necessary or desired.

Referring again to FIG. 1, optical fibers $115_1$-$115_n$ may include connector 112 for connection with each light source $110_1$-$110_n$. In one embodiment, a FC or SMA connector (not shown) may be used for this purpose. Connector 112 allow a proper insertion of a fiber into a fiber coupler that has a fiber receptacle. In another embodiment, a pigtailed coupler may be used.

In one embodiment, fiber optic bundle 120 may be provided with a device that modifies the optical parameters of the transmitted light. Such devices include an optical modulator an attenuator, a polarization controller, a shutter, an acousto-optic modulator, and an electro-optic modulator. Other suitable devices that modify the optical parameters of the transmitted light may be used as necessary and desired.

In another embodiment, a device that monitors the parameters of the light, such as a power meter, may be used.

In one embodiment, such devices may be provided between and may be placed between light source 110 and optical fiber 115. In another embodiment, such devices may be fiberized and placed in line within fiber optic bundle 120.

In one embodiment, the output ends of optical fibers $115_1$-$115_n$ may be assembled into a single output optical connector 122. In one embodiment, connector 122 may be a FC or SMA connector.

In one embodiment, fiber optic bundle 120 may be held by a fixture (not shown) that is rectangular in shape. A rectangular fixture hold fibers that are aligned along a horizontal line, and helps to align fiber optic bundle 120 with respect to the rest of the optical system. In another embodiment, fiber optic bundle 120 may be held by a fixture that is semi-cylindrical in shape. Other shapes of the fixture that simplify optical alignment may be used as well.

Light exiting optical fibers $115_1$-$115_n$ in fiber optic bundle 120 may be provided to beam collimator 125. Beam collimator 125 may be a lens-based collimator or a mirror-based collimator. Beam collimator 125 converts a diverging beam from fiber optic bundle 120 into a collimated beam.

The excitation light may pass through beam forming element 130. Beam forming element 130 allows system 100 to operate in line confocal mode or in wide field mode.

In one embodiment, if system 100 is operated in line confocal mode, beam forming element 130 may convert the collimated beam of laser light into a focused beam diverging in one direction only. The full divergence angle of the output beams Dq may calculated by the following equation:

$$Dq=2*\arctan(D/(2*f))$$

where f is the focal length of microscope objective 145, and D is the linear dimension of the imaging area on target 150 along the axis of the line. In one embodiment, a Powell lens, such as that disclosed in U.S. Pat. No. 4,826,299, the disclosure of which is incorporated by reference in its entirety, may be used. In another embodiment, a cylindrical lens may be used.

Other suitable beam forming elements 130 include diffraction gratings and holographic elements.

In another embodiment, if system 100 is to be operated in wide field mode, beam forming element 130 may be a conventional lens with spherical or aspherical surfaces. In another embodiment, beam forming element 130 may be a focusing mirror.

Following beam forming element 130, light is directed by beam deflecting device 140, such as a scanning mirror. Beam deflecting device 140 is used to adjust a position of the illumination line on sample 150.

In one embodiment, beam deflecting device 140 may include a narrow mirror centered on, or axially offset from, the rear of microscope objective 145. This embodiment has a geometry and reflective property as follows:

Width ~1/10 times the diameter of the rear aperture of the objective;

Length ~1.6 times the diameter of the rear aperture of the objective;

Optically flat; and

Highly reflective 300 nm to 800 nm.

These particular properties of the mirror provide several key advantages. First, it makes it possible to use a single mirror for all excitation wavelengths. Relative to a multiband dichroic mirror this greatly increases the flexibility in adapting the system to a wide range of light sources.

Second, it uses the rear aperture of the objective at its widest point. This leads to the lowest achievable level of diffraction which in turn yields the narrowest achievable width of the line of laser illumination at the sample.

Third, the field of view that can be achieved is large as is possible with the simple one-tilting-mirror strategy. By using two mirrors one can simultaneously change the direction of the beam and translate the beam.

Beam deflecting device 140 may also be a dichroic mirror. The design of the dichroic mirror will be such that the radiation from all excitation lasers is efficiently reflected, and that light in the wavelength range corresponding to fluorescence emission is efficiently transmitted. An example of a suitable dichroic mirror is a multi-band mirror based on Rugate technology.

Beam deflecting device 140 is moved by actuator 135. In one embodiment, actuator 135 may be a galvanometer with an integral sensor for detecting the angular position. The galvanometer is driven by a suitably-tuned servo system. The bearing system is based on flexures to effectively eliminate wear and issues with friction in the bearing. An example of a galvanometer is the Cross Flexure Pivot Suspension Moving Magnet Galvanometer, available from Nutfield Technology, Inc., 49 Range Road, Windham, N.H. 03087-2019.

In one embodiment, when system 100 is operated in line confocal mode, actuator 135 moves beam deflecting device 140 to cause light from fiber optic bundle 120 to move across sample 150.

In another embodiment, when system 100 is operated in wide field mode, actuator 135 may fix beam deflecting device 140 relative to sample 150. This may be at, for example, a 45 degree angle. In still another embodiment, when system 100 is operated in wide field mode, actuator 135 may move beam deflecting device 140 relative to sample 150 at a frequency that is greater than the frequency at which detector 190 acquires light. Such movement may provide a more uniform light field over sample 150.

The remainder of system 100, including microscope objective 145, sample support 155, optical filter 165, actuator 170 for optical filter 165, image forming lens 175, emission filter 180, actuator 185 for emission filter 180, and at least one camera 190, is fully described in U.S. patent application Ser. No. 11/184,444.

Light from separate light sources $110_1$-$110_n$ may be delivered through fiber optic bundle 120 in a variety of fashions. For example, light from different light sources $110_1$-$110_n$ may be transmitted sequentially, one source at a time. That is, light from a first light source $110_1$ is transmitted, then light from a second light source $110_2$ is transmitted, and so on. This technique may transmit light sequentially one wavelength at a time.

In another embodiment, light from the different light sources may be transmitted simultaneously. This technique transmits two or more wavelengths fibers simultaneously through fiber optic bundle 120.

As discussed above, optical fibers $115_1$-$115_n$. may be spatially offset at the end of fiber optic bundle 120. For example, referring to FIG. 2d, light exiting fiber optic bundle 120 will form lines at different locations on sample 150. Relative to the optical fiber in the center of fiber optic bundle 120, light from the top and bottom optical fibers will strike target 150 with a displacement along an axis perpendicular to the axis of detector 190 (e.g., a rolling shutter), while light from the left and right optical fibers will strike target 150 with a displacement along the axis of detector 190.

When system 100 is operated in the wide field mode, this displacement can be compensated for by ensuring that the light striking target 150 has field that is larger than target 150. Thus, even though there may be some offset, target 150 is fully illuminated regardless of which optical fiber $115_1$-$115_n$. in fiber optic bundle 120 provides the excitation light. This is illustrated in FIG. 3.

When system 100 is operated in line confocal mode, the displacement along the axis of detector 190 may be compensated for by ensuring that the incident line on sample 150 is longer than the field of view of detector 190. The displacement along the axis that is perpendicular to detector 190 may be compensated for by providing an offset of a control voltage for actuator 145 of beam deflecting device 140. Thus, with this voltage offset, actuator 145 will position beam deflecting device 140 appropriately so that light from either the top or bottom optical fibers still forms the illumination area that overlaps to form an active area for detector 190.

The voltage offset for actuator 145 may be determined as follows. First, a rolling shutter of detector 150 moves from the top of the sample area to the bottom of the sample area with a constant velocity. During this movement, an illumination line is provided from an optical fiber 115 of fiber optic bundle 120 and is moved across the field of view.

The illumination line must be moved in such a way that its image will be constantly overlapped on the rolling shutter area on the detector. This may be achieved by providing actuator 134 with a control voltage that has approximately saw-tooth shape. The ascending part of the control voltage signal causes actuator 135 to move beam deflecting device 150 to scan the illumination line across the field of view. The descending part of the control voltage signal causes actuator 135 to move beam deflecting device 150 to its initial position before acquisition of the next image.

In one embodiment, the duration of scanning portion of the saw-tooth waveform is preferably equal to the image acquisition time. The duration of scanner return portion of the signal is preferably as short as possible and may vary depending on the mechanical parameters of the scanning system.

For a well-corrected optical system, the driving signal is defined by its maximum and minimum voltages of the saw-tooth signal. These voltages are measured during a calibration phase as voltages that are needed to bring the illumination line to position in the field of view that corresponds to a first and last row of pixels. With optics that have some curvature of field, however, the calibration of start and stop points alone may not be sufficient. Therefore, during calibration, a driving voltage that is required to bring the illumination line to a few intermediate positions in the field of view is determined. Based on this value, polynomial regression may be used to calculate the whole scanning portion of the saw-tooth waveform.

This process may be repeated to determine the voltage offset required for each fiber optic $115_1$-$115_n$. in fiber optic bundle 120.

In one embodiment, if multiple wavelengths are being used, the chromatic aberration of the objective will introduce additional displacement for illumination areas formed by light delivered by the fibers in the bundle, such as related offsets of the illumination lines. In order to compensate for fiber offsets and chromatic aberration, the control voltage signal is determined for each wavelength individually. Preferably, this may be done before image acquisition. The sets of control voltage signal parameters are stored and recalled when the scan is performed.

The offsets illustrated in FIGS. 2a, 2b, and 2c may be similarly compensated by one or a combination of the techniques discussed above.

As disclosed in U.S. patent application Ser. No. 11/184, 444, simultaneous imaging techniques using multiple detectors may be used with the disclosed system. As discussed above, however, the spatial offset of optical fibers $115_1$-$115_n$. at the end of fiber optic bundle 120 will cause the light to strike sample 150 at displacements on the axis of detector 190 and perpendicular to the axis of detector 190. Unlike the previous embodiment, because multiple light beams are striking beam deflecting device 140 simultaneously, applying an offset voltage to actuator 145 is impractical since it will affect all light. Because of this, the use of certain optical fibers $115_1$-$115_n$ simultaneously, such as those that have offsets in direction perpendicular to the axis of detector 190, may be undesirable. To compensate for the offset for the second detector, the position of the second detector in the imaging plane may be adjusted.

Other embodiments, uses, and advantages of the present invention will be apparent to those skilled in the art from consideration of the specification and practice of the invention disclosed herein. The specification and examples should be considered exemplary only.

What is claimed is:

1. A system for fiber optic bundle-based illumination for an imaging system, comprising:
    a fiber optic bundle, the fiber optic bundle comprising a plurality of optical fibers, each of the plurality of optical fibers receive light from a plurality of light sources to deliver light through the fiber optical bundle;
    the plurality of optical fibers having a spacing there between cores of the optical fibers;
    a beam forming element adjacent to the fiber optic bundle that selects a mode of operation for the imaging system; and
    a beam deflecting device adjacent to the beam forming element that deflects the light on a sample.

2. The system of claim 1, further comprising:
    a beam collimator that collimates the light, wherein the beam collimator is located in between the beam forming element and the fiber optic bundle.

3. The system of claim 1, wherein the optical fibers in the fiber optic bundle comprise at least one of multimode optical fibers, single mode optical fibers, and combinations thereof.

4. The system of claim 1, wherein the optical fibers in the fiber optic bundle comprise at least one of polarization maintaining optical fibers, photonic crystal optical fibers, and combinations thereof.

5. The system of claim 1, wherein the optical fibers at an output end of the fiber optic bundle are axially offset with respect to an axis of the fiber optic bundle.

6. The system of claim 1, wherein the optical fibers at an output end of the fiber optic bundle are arranged in a pattern selected from the group consisting of a single line, multiple lines, a cross, a circle, and a rectangle.

7. The system of claim 1, wherein the optical fibers at an output end of the fiber optic bundle are uniformly spaced.

8. The system of claim 1, wherein the ends of the optical fibers have a geometry that is normal to an optical axis of the optical fibers, at an angle to the optical axis of the optical fibers at an output end of the fiber optic bundle, or spherical.

9. The system of claim 1, wherein the optical fibers in the fiber optic bundle are combined into an optical connector at an output end of the fiber optic bundle.

10. The system of claim 1, wherein light is transmitted through the fiber optic bundle sequentially one optical fiber at a time.

11. The system of claim 1, wherein the fiber optic bundle transmits the light through two or more optical fibers simultaneously.

12. The system of claim 1, wherein the fiber optic bundle transmits the light sequentially one wavelength at a time.

13. The system of claim 1, wherein the fiber optic bundle transmits the light of two or more wavelengths simultaneously.

14. The system of claim 1, wherein the light source comprises at least one of lasers, laser diodes, light emitting diodes, lamps, and combinations thereof.

15. The system of claim 2, wherein the beam collimator comprises at least one of a lens-based collimator and a mirror-based collimator.

16. The system of claim 1, wherein the beam forming element comprises at least one of Powell lenses, cylindrical lenses, diffraction gratings, holographic elements, focusing mirrors, and combinations thereof.

17. The system of claim 1, wherein the beam forming element comprise at least one of conventional lenses having spherical surfaces, conventional lenses having aspherical surfaces, focusing mirrors, and combinations thereof.

18. The system of claim 1, wherein the beam deflecting device comprises:
    a scanning mirror; and
    at least actuator.

19. The system of claim 1, wherein the mode of operation of the imaging system is line confocal mode.

20. The system of claim 1, wherein the mode of operation of the imaging system is wide field mode.

21. The system of claim 1, wherein the mode of operation of the imaging system is point confocal mode.

22. The system of claim 1, wherein the each optical fiber is coupled to a respective light source.

* * * * *